(12) United States Patent
Choi et al.

(10) Patent No.: US 12,451,941 B2
(45) Date of Patent: Oct. 21, 2025

(54) DEVICE AND METHOD FOR CONTROLLING BEAMFORMER IN WIRELESS COMMUNICATION SYSTEM

(71) Applicants: SAMSUNG ELECTRONICS CO., LTD., Suwon-si (KR); KOREA ADVANCED INSTITUTE OF SCIENCE AND TECHNOLOGY, Daejeon (KR)

(72) Inventors: Yongyun Choi, Suwon-si (KR); Chulhee Jang, Suwon-si (KR); Junil Choi, Daejeon (KR); Sucheol Kim, Daejeon (KR); Hyeongtaek Lee, Daejeon (KR); Hwanjin Kim, Daejeon (KR)

(73) Assignees: SAMSUNG ELECTRONICS CO., LTD., Suwon-si (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 366 days.

(21) Appl. No.: 18/141,812

(22) Filed: May 1, 2023

(65) Prior Publication Data
US 2023/0336224 A1 Oct. 19, 2023

Related U.S. Application Data

(63) Continuation of application No. PCT/KR2021/015666, filed on Nov. 2, 2021.

(30) Foreign Application Priority Data

Nov. 2, 2020 (KR) .................. 10-2020-0144813

(51) Int. Cl.
H04B 7/0456 (2017.01)
H04B 7/0426 (2017.01)
H04B 7/06 (2006.01)

(52) U.S. Cl.
CPC ......... *H04B 7/0617* (2013.01); *H04B 7/0426* (2013.01); *H04B 7/0456* (2013.01); *H04B 7/0639* (2013.01)

(58) Field of Classification Search
CPC .. H04B 7/0413; H04B 7/0456; H04B 7/0465; H04B 7/0617; H04B 7/0639; H04B 17/12; H04W 52/42
(Continued)

(56) References Cited

U.S. PATENT DOCUMENTS 8,838,051 B1 * 9/2014 Su ..................... H04B 7/0465
375/267
8,948,300 B2 2/2015 Kim et al.
(Continued)

FOREIGN PATENT DOCUMENTS

CN 104320841 A 1/2015
CN 110535518 A 12/2019
(Continued)

OTHER PUBLICATIONS

Abdul Haq Nalband et al., "Power Scaling and Antenna Selection Techniques for Hybrid Beamforming in mmWave Massive MIMO Systems", International Journal of Electronics and Telecommunications, Sep. 2020, vol. 66, No. 3, pp. 529-535, DOI:10.24425/ijet.2020.134009.
(Continued)

*Primary Examiner* — Harun Chowdhury
(74) *Attorney, Agent, or Firm* — Sughrue Mion, PLLC

(57) ABSTRACT

A method performed by a base station in a wireless communication system, includes: determining, from among a
(Continued)

plurality of antennas of the base station, a first antenna that meets a power threshold, based on a first beamformer scaled according to a power limit; generating a second beamformer corresponding to the first antenna; applying an overlap coefficient matrix to the second beamformer; generating a third beamformer by combining the second beamformer to which the overlap coefficient matrix has been applied and the first beamformer; and transmitting a signal using the third beamformer.

16 Claims, 9 Drawing Sheets

(58) Field of Classification Search
USPC .................................. 370/203, 252, 328, 329
See application file for complete search history.

(56) References Cited

U.S. PATENT DOCUMENTS

| | | | |
|---|---|---|---|
| 9,143,211 | B2 | 9/2015 | Pi et al. |
| 9,660,708 | B1 | 5/2017 | Frank |
| 2010/0279729 | A1 | 11/2010 | Hui et al. |
| 2012/0009961 | A1 | 1/2012 | Uln et al. |
| 2012/0286996 | A1 | 11/2012 | Shany et al. |
| 2014/0235287 | A1 | 8/2014 | Maltsev et al. |
| 2015/0063254 | A1 | 3/2015 | Yue et al. |
| 2016/0099499 | A1* | 4/2016 | Ezri .................... H04B 7/0617 343/876 |
| 2016/0192297 | A1 | 6/2016 | Kim et al. |
| 2018/0375548 | A1 | 12/2018 | Li et al. |
| 2020/0178182 | A1* | 6/2020 | Raghavan ............. H04B 17/12 |

FOREIGN PATENT DOCUMENTS

| | | |
|---|---|---|
| KR | 10-2013-0024871 A | 3/2013 |
| KR | 10-2013-0067706 A | 6/2013 |
| KR | 10-2014-0017487 A | 2/2014 |
| KR | 10-2015-0016426 A | 2/2015 |
| KR | 10-2015-0095864 A | 8/2015 |
| KR | 10-2016-0090659 A | 8/2016 |
| KR | 10-2018-0108551 A | 10/2018 |
| KR | 10-2019-0090209 A | 8/2019 |

OTHER PUBLICATIONS

International Search Report (PCT/ISA/210) issued by the International Searching Authority on Feb. 25, 2022 in International Application No. PCT/KR2021/015666.
Written Opinion (PCT/ISA/237) issued by the International Searching Authority on Feb. 25, 2022 in International Application No. PCT/KR2021/015666.
Communication dated Nov. 8, 2024, issued by the Korean Intellectual Property Office in Korean Application No. 10-2020-0144813.

* cited by examiner

DEVICE AND METHOD FOR CONTROLLING BEAMFORMER IN WIRELESS COMMUNICATION SYSTEM

CROSS-REFERENCE TO RELATED APPLICATIONS

This application is a continuation application of International Application No. PCT/KR2021/015666, filed on Nov. 2, 2021, which claims priority to Korean Patent Application 10-2020-0144813, filed on Nov. 2, 2020, in the Korean Intellectual Property Office, the disclosures of which are incorporated by reference herein in their entireties.

BACKGROUND

1. Field

The disclosure relates generally to wireless communication systems, and more particularly, to an electronic device and a method for controlling a beamformer.

2. Description of Related Art

To meet an increasing demand for wireless data traffic since deployment of 4G communication systems, efforts have been made to develop an improved 5G and/or pre-5G communication system. The 5G and/or pre-5G communication system may also be referred to as a "Beyond 4G Network" and/or a "Post LTE System".

A related 5G communication system may be implemented to operate in higher frequency bands (e.g., mmWave, such as, but not limited to, 28 GHz or 60 GHz bands), so as to achieve higher data rates than related 4G communication systems. In order to potentially decrease propagation loss of the radio waves and increase the transmission distance, the related 5G communication systems may implement techniques such as, but not limited to, beamforming, massive multiple-input multiple-output (MIMO), full dimensional MIMO (FD-MIMO), array antennas, analog beam forming, and large scale antenna techniques.

In addition to the techniques described above, the related 5G communication systems may attempt to effect further system network improvements based on techniques such as, but not limited to, advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

Other techniques that may be implemented by a related 5G communication system may include hybrid frequency-shift keying (FSK) and quadrature amplitude modulation (QAM) (FQAM), sliding window superposition coding (SWSC), advanced coding modulation (ACM), filter bank multi carrier (FBMC), non-orthogonal multiple access (NOMA), sparse code multiple access (SCMA), and the like.

A related 5G communication system may include a massive MIMO system that may include transmitters and/or receivers that use a very large number of antennas. However, in order to obtain sufficient gain through the massive MIMO system, a base station may need to previously obtain channel state information (CSI). Accordingly, there exists a need to effectively acquire the CSI.

SUMMARY

Various embodiments of the present disclosure may provide apparatuses and methods for efficiently controlling a beamformer to compensate for a power loss due to a power limit of a base station antenna in a wireless communication system.

According to an aspect of the disclosure, an operating method of a base station in a wireless communication system, includes: determining, from among a plurality of antennas of the base station, a first antenna that meets a power threshold, based on a first beamformer scaled according to a power limit; generating a second beamformer corresponding to the first antenna; applying an overlap coefficient matrix to the second beamformer; generating a third beamformer by combining the second beamformer to which the overlap coefficient matrix has been applied and the first beamformer; and transmitting a signal using the third beamformer.

The operating method may further include: determining, from among the plurality of antennas, a second antenna that meets the power threshold, based on the third beamformer; and determining whether a number of determined antennas is greater than or equal to a threshold.

The transmitting the signal may include transmitting the signal using the third beamformer, based on determining that the number of determined antennas is greater than or equal to the threshold.

The operating method may further include, based on determining that the number of determined antennas is less than the threshold, determining, from among the plurality of antennas, a fourth antenna that meets the power threshold, based on the first beamformer scaled according to the power limit.

The operating method may further include scaling down, according to the first beamformer, one or more amplitudes applied to the plurality of antennas at a same rate, based on a maximum value of amplitudes corresponding to the first beamformer.

The operating method may further include determining the overlap coefficient matrix based on the first beamformer and the third beamformer.

The operating method may further include determining the overlap coefficient matrix such that a transmission power of the third beamformer is less than a power limit value corresponding to respective power limits of the plurality of antennas.

The operating method may further include determining the overlap coefficient matrix such that a transmission power of the third beamformer is less than a corresponding power limit value of at least one antenna of the plurality of antennas.

According to an aspect of the disclosure, an apparatus of a base station in a wireless communication system, includes: an antenna array including a plurality of antennas; a memory storing instructions; and at least one processor operatively connected to the antenna array and the memory, wherein the at least one processor is configured to execute the instructions to: determine, from among the plurality of antennas, a first antenna that meets a power threshold, based on a first beamformer scaled according to a power limit; generate a second beamformer corresponding to the first antenna; apply an overlap coefficient matrix to the second beamformer; generate a third beamformer by combining the second beamformer to which the overlap coefficient matrix has been applied and the first beamformer; and transmit a signal using the third beamformer.

The at least one processor may be further configured to execute the instructions to: determine, from among the plurality of antennas, a second antenna that meets the power threshold, based on the third beamformer, and determine whether a number of determined antennas is greater than or equal to an antenna threshold.

The at least one processor may be further configured to execute the instructions to transmit the signal using the third beamformer, based on determining that the number of determined antennas is greater than or equal to the antenna threshold.

The at least one processor may be further configured to execute the instructions to, based on determining that the number of determined antennas is less than the antenna threshold, determine, from among the plurality of antennas, a fourth antenna that meets the power threshold, based on the first beamformer scaled according to the power limit.

The at least one processor may be further configured to execute the instructions to scale down, according to the first beamformer, one or more amplitudes applied to the plurality of antennas at a same rate, based on a maximum value of amplitudes corresponding to the first beamformer.

The at least one processor may be further configured to execute the instructions to determine the overlap coefficient matrix based on the first beamformer and the third beamformer.

The at least one processor may be further configured to execute the instructions to determine the overlap coefficient matrix such that a transmission power of the third beamformer is less than a power limit value corresponding to respective power limits of the plurality of antennas.

The at least one processor may be further configured to execute the instructions to determine the overlap coefficient matrix such that a transmission power of the third beamformer is less than a corresponding power limit value of at least one antenna of the plurality of antennas.

According to an aspect of the disclosure, a non-transitory computer-readable storage medium stores computer-executable instructions for operating a base station in a wireless communication system that, when executed by at least one processor of the base station, cause the base station to: determine, from among a plurality of antennas of the base station, a first antenna that meets a power threshold, based on a first beamformer scaled according to a power limit; generate a second beamformer corresponding to the first antenna; apply an overlap coefficient matrix to the second beamformer; generate a third beamformer by combining the second beamformer to which the overlap coefficient matrix has been applied and the first beamformer; and transmit a signal using the third beamformer.

The computer-executable instructions, when executed by the at least one processor, may further cause the base station to: determine, from among the plurality of antennas, a second antenna that meets the power threshold, based on the third beamformer; determine whether a number of determined antennas is greater than or equal to an antenna threshold; based on a determination that the number of determined antennas is greater than or equal to the antenna threshold, transmit the signal using the third beamformer; and based on a determination that the number of determined antennas is less than the antenna threshold, determine, from among the plurality of antennas, a fourth antenna that meets the power threshold, based on the first beamformer scaled according to the power limit.

The computer-executable instructions, when executed by the at least one processor, may further cause the base station to determine the overlap coefficient matrix based on the first beamformer and the third beamformer.

The computer-executable instructions, when executed by the at least one processor, may further cause the base station to determine the overlap coefficient matrix such that a transmission power of the third beamformer is less than a corresponding power limit value of at least one antenna of the plurality of antennas.

An apparatus and a method according to one or more embodiments of the present disclosure, may improve a communication speed by efficiently controlling a beamformer in a wireless communication system.

Effects obtainable from the present disclosure are not limited to the above-mentioned effects, and other effects which are not mentioned may be clearly understood by those skilled in the art of the present disclosure through the following descriptions.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
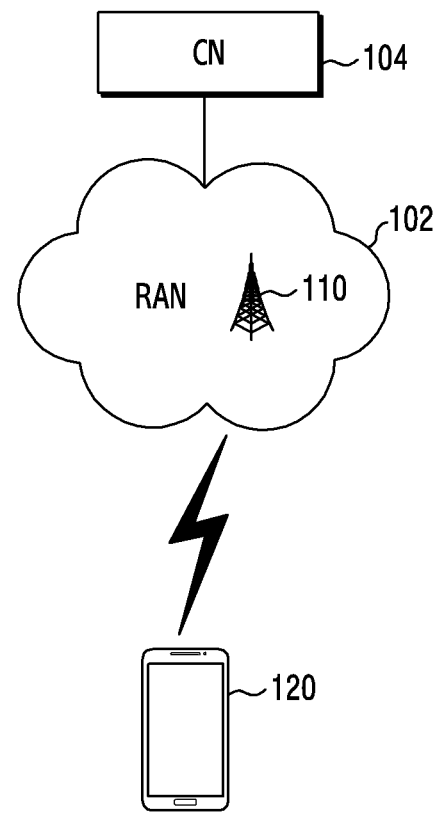
FIG. 1 illustrates a wireless communication system, according to various embodiments of the present disclosure.

Terms used in the present disclosure are used merely to describe specific embodiments, and may not intend to limit the scope of other embodiments. Singular expressions may include plural expressions unless the context clearly indicates otherwise. Terms used herein, including technical or scientific terms, may have the same meaning as those commonly understood by a person of ordinary skill in the technical field described in the present disclosure. Among the terms used in the present disclosure, terms defined in a general dictionary may be interpreted as having the same or similar meaning as those in the context of the related art, and unless explicitly defined in the present disclosure, may not be interpreted as ideal or excessively formal meanings. In some cases, even terms defined in the present disclosure may not be interpreted to exclude embodiments of the present disclosure.

A hardware-based approach may be described as an example in various embodiments of the present disclosure to be described hereinafter. However, various embodiments of the present disclosure include technology which may use both hardware and software, and thus various embodiments of the present disclosure may not exclude a software-based approach.

Hereafter, the present disclosure relates to an apparatus and a method for controlling a beamformer in a wireless communication system. For example, the present disclosure describes techniques for efficiently controlling the beamformer to compensate for power loss due to power limit of a base station antenna in the wireless communication system.

Terms for indicating signals, terms for indicating channels, terms for indicating control information, terms for indicating network entities, and terms for indicating device components used in the following explanation are illustrated for convenience of explanation. Accordingly, the present disclosure is not limited to the following terms, and may use other terms having the same technical meaning.

In the following description, a physical channel and a signal may be used interchangeably with data and/or a control signal. For example, a physical downlink shared channel (PDSCH) may be a term indicating a physical channel carrying data, but the term PDSCH may be also used to indicate the data carried by the physical channel. That is, in the present disclosure, the expression "transmitting the physical channel" may be interpreted equivalently to the expression "transmitting data or a signal through the physical channel".

Hereinafter, in the present disclosure, higher signaling may refer to a signal transmission method transmitted from a base station to a terminal using a downlink data channel of the physical layer, and/or from a terminal to a base station using an uplink data channel of the physical layer. The higher signaling may be understood as radio resource control (RRC) signaling and/or media access control (MAC) control element (CE), for example.

In the present disclosure, to determine whether a specific condition is satisfied or fulfilled, expressions such as greater than or less than may be used but may be merely an expression by way of example and do not exclude expressions of equal to or greater than or equal to or less than. For example, a condition expressed as "greater than or equal to" may be replaced by "greater than", a condition expressed as "less than or equal to" may be replaced by "less than", and a condition expressed as "greater than or equal to and less than" may be replaced by "greater than and less than or equal to".

The present disclosure may describe various embodiments using terms used in a communication standard (e.g., 3rd generation partnership project (3GPP)), which may be merely exemplary for explanations. That is, various embodiments of the present disclosure may also be applicable to other multi-access technologies and the telecommunication standards that employ these technologies.

FIG. 1 illustrates a wireless communication system, according to various embodiments of the present disclosure.

Referring to FIG. 1, the wireless communication system may include a radio access network (RAN) 102 and a core network (CN) 104.

The RAN 102 may be directly connected to a user device (e.g., a terminal 120) and may include an infrastructure which provides radio access to the terminal 120. The RAN 102 may include a set of base stations including a base station 110. The plurality of the base stations 110 may perform communication via interfaces established between them. For example, at least one of the interfaces established between the base stations may be wired and/or wireless.

The base station 110 may have a structure divided into a central unit (CU) and a distributed unit (DU). In this case, a single CU may control a plurality of DUs. In some embodiments, the base station 110 may be referred to as an access point (AP), a next generation node B (gNB), a 5G node, a wireless point, a transmission/reception point (TRP), or another term having an equivalent technical meaning.

The terminal 120 may access the RAN 102 and/or communicate with the base station 110 over a radio channel. In some embodiments, the terminal 120 may be referred to as a user equipment (UE), a mobile station, a subscriber station, a remote terminal, a wireless terminal, a user device or another term having an equivalent technical meaning.

The CN 104, which may be a network for managing the whole system, may control the RAN 102. Alternatively or additionally, the CN 104 may process data and/or control signals for the terminal 120 transmitted and/or received via the RAN 102. The CN 104 may perform various functions such as, but not limited to, controlling a user plane and/or a control plane, processing mobility, managing subscriber information, charging, and interworking with systems of other types (e.g., a long term evolution (LTE) system). To fulfill the described various functions, the CN 104 may include a plurality of entities functionally separated with different network functions (NFs). For example, the CN 104 may include a control server which may perform grouping and clustering, in a band sharing system according to an embodiment of the present disclosure. The control server may be referred to as a control unit and/or a processor. The listed functional objects may be implemented by at least one hardware device (e.g., a server). In an embodiment, functions of a plurality of functional objects may be performed in one device. For example, the plurality of the functional objects may be implemented by a plurality of virtual machines executed by one host device.

Figure 2:
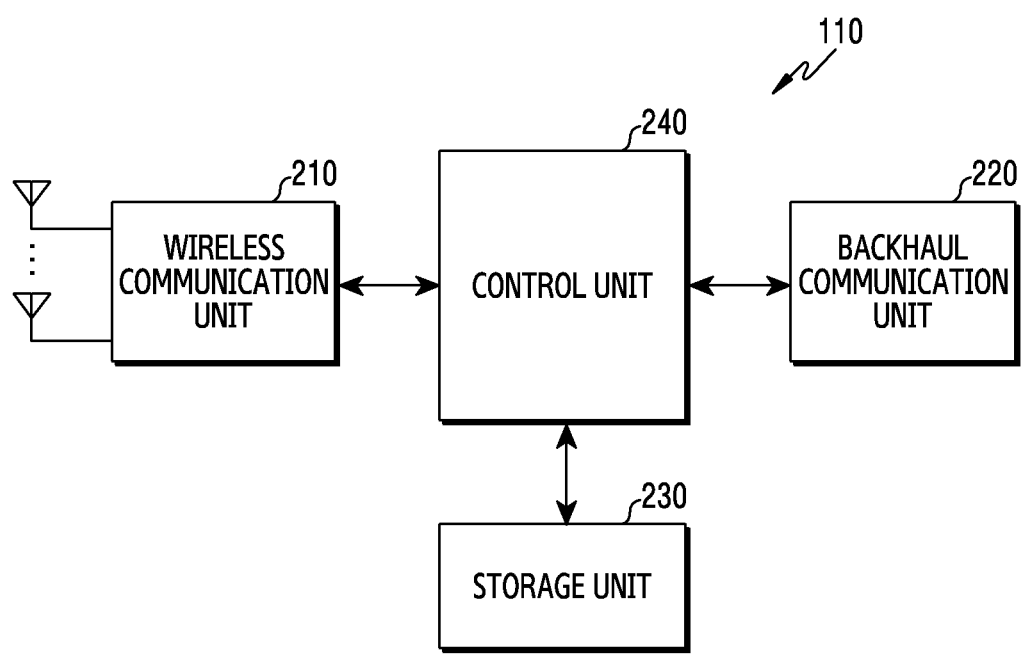
FIG. 2 illustrates a configuration of a base station in a wireless communication system, according to various embodiments of the present disclosure.

FIG. 2 illustrates a configuration of a base station 110 in a wireless communication system, according to various embodiments of the present disclosure. The configuration illustrated in FIG. 2 may be understood as a configuration of a base station 110. A term "~unit" or "~er" used hereinafter may indicate a unit for processing at least one function or operation, and may be implemented in hardware, software, and/or a combination of hardware and software.

Referring to FIG. 2, the base station 110 may include a wireless communication unit 210, a backhaul communication unit 220, a storage unit 230, and a control unit 240.

The wireless communication unit 210 may perform functions for transmitting and/or receiving a signal over a radio channel. In an embodiment, the wireless communication unit 210 may perform a conversion function between a baseband signal and a bit stream according to a physical layer standard of the system. For example, in data transmission, the wireless communication unit 210 may generate complex symbols by encoding and/or modulating a transmit bit stream. Alternatively or additionally, in data reception, the wireless communication unit 210 may restore a received bit stream by demodulating and/or decoding a baseband signal.

In an embodiment, the wireless communication unit 210 may up-convert a baseband signal into a radio frequency (RF) band signal and transmit the RF band signal via an antenna. Alternatively or additionally, the wireless communication unit 210 may down-convert an RF band signal received through an antenna into a baseband signal. The wireless communication unit 210 may include a transmit filter, a receive filter, an amplifier, a mixer, an oscillator, a digital to analog convertor (DAC), an analog to digital convertor (ADC), and the like.

In optional or additional embodiments, the wireless communication unit 210 may include a plurality of transmit and receive paths. Alternatively or additionally, the wireless communication unit 210 may include at least one antenna array including a plurality of antenna elements.

In terms of hardware, the wireless communication unit 210 may include a digital unit and an analog unit. The analog unit may include a plurality of sub-units according to an operating power, an operating frequency, and the like. The digital unit may be implemented with at least one processor (e.g., a digital signal processor (DSP)).

The wireless communication unit 210 may transmit and/or receive the signal as described above. Accordingly, whole or a part of the wireless communication unit 210 may be referred to as a transmitter, a receiver, and/or a transceiver. The transmission and/or reception conducted over the radio channel may be used to implement the above-described processing performed by the wireless communication unit 210.

The backhaul communication unit 220 may provide an interface for communicating with other nodes (e.g., other base stations 110, terminal 120) in the network (e.g., RAN network 102). That is, the backhaul communication unit 220 may convert a bit stream transmitted from the base station 110 to another node (e.g., another access node, another base station, an upper node, a core network, and the like), into a physical signal, and/or convert a physical signal received from another node into a bit stream.

The storage unit 230 may store data such as, but not limited to, a basic program, an application program, and/or setting information for the operation of the base station 110. The storage unit 230 may include a volatile memory, a non-volatile memory, and/or a combination of a volatile memory and a non-volatile memory. The storage unit 230 may provide the stored data at a request of the control unit 240.

The control unit 240 may control general operations of the base station 110. For example, the control unit 240 may transmit and/or receive a signal through the wireless communication unit 210 and/or the backhaul communication unit 220. Alternatively or additionally, the control unit 240 may record and/or read data in and/or from the storage unit 230. The control unit 240 may perform functions of a protocol stack required by a communication standard. In some embodiments, the protocol stack may be included in the wireless communication unit 210. The control unit 240 may include at least one processor. According to various embodiments, the control unit 330 of FIG. 3 may be included in a band sharing system, to transmit a control command to each of the devices constituting the band sharing system. Herein, the control command may include an instruction set and/or code stored in the storage unit 230, and may be an instruction/code at least temporarily residing in the control unit 240 and/or a storage space storing instructions/codes (e.g., storage unit 230), or may be a part of circuitry constituting the control unit 240.

According to various embodiments, the control unit 240 may control the base station 110 to perform operations according to the various embodiments described in reference to FIGS. 4 to 9.

Figure 3:
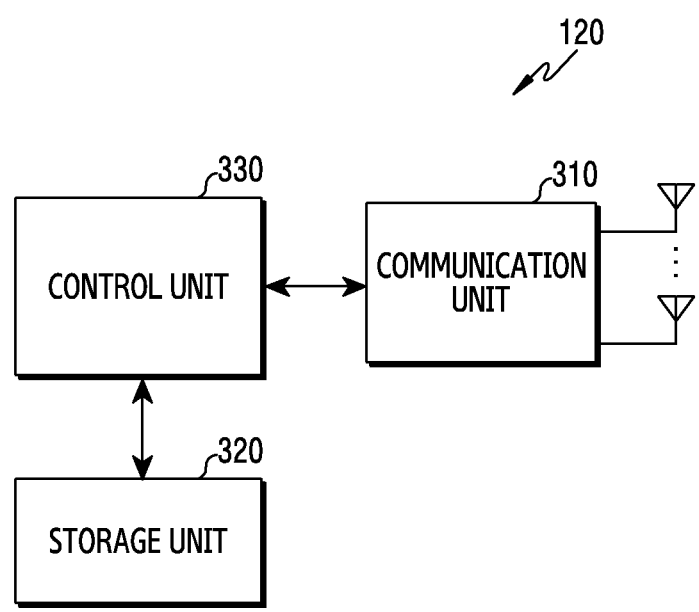
FIG. 3 illustrates a configuration of a terminal in a wireless communication system, according to various embodiments of the present disclosure.

FIG. 3 illustrates a configuration of a terminal 120 in a wireless communication system, according to various embodiments of the present disclosure. The configuration shown in FIG. 3 may be understood as a configuration of a terminal 120. A term "~unit" or "~er" used hereinafter may indicate a unit for processing at least one function or operation, and may be implemented in hardware, software, or a combination of hardware and software.

Referring to FIG. 3, the terminal 120 may include a communication unit 310, a storage unit 320, and a control unit 330.

The communication unit 310 may perform functions for transmitting and/or receiving a signal over a radio channel. In an embodiment, the communication unit 310 may perform a conversion function between a baseband signal and a bit stream according to a physical layer standard of the system. For example, in data transmission, the communication unit 310 may generate complex symbols by encoding and/or modulating a transmit bit stream. Alternatively or additionally, in data reception, the communication unit 310 may restore a received bit stream by demodulating and/or decoding a baseband signal. In an optional or additional embodiment, the communication unit 310 may up-convert a baseband signal into an RF band signal and transmit the RF band signal via an antenna. Alternatively or additionally, the communication unit 310 may down-convert an RF band signal received through an antenna into a baseband signal. In some embodiments, the communication unit 310 may include a transmit filter, a receive filter, an amplifier, a mixer, an oscillator, a DAC, an ADC, and the like.

In an embodiment, the communication unit 310 may include a plurality of transmit and receive paths. Alternatively or additionally, the communication unit 310 may include at least one antenna array including a plurality of antenna elements. In terms of hardware, the communication unit 310 may include a digital circuit and/or an analog circuit (e.g., a radio frequency integrated circuit (RFIC)). In some embodiments, the digital circuit and the analog circuit may be implemented in a single package. Alternatively or additionally, the communication unit 310 may include a plurality of RF chains. In various embodiments, the communication unit 310 may perform beamforming.

In an embodiment, the communication unit 310 may include various communication modules to process signals of different frequency bands. For example, the communication unit 310 may include a plurality of communication modules to support a plurality of radio access technologies. The plurality of radio access technologies may include, but not be limited to, Bluetooth low energy (BLE), wireless fidelity (Wi-Fi), WiFi Gigabyte (WiGig), a cellular network (e.g., LTE, NR) and the like. Alternatively or additionally, the different frequency bands may include, but not be limited to, a super high frequency (SHF) (e.g., 2.5 GHz, 5 GHz) band, and a millimeter wave (mmWave) (e.g., 60 GHz) band.

The communication unit 310 may transmit and/or receive the signal as described above. Accordingly, whole or a part of the communication unit 310 may be referred to as a transmitter, a receiver, and/or a transceiver. Also, the transmission and reception conducted over the radio channel is used to embrace the above-described processing performed by the communication unit 310 in the following description.

The storage unit 320 may store data such as, but not limited to, a basic program, an application program, and/or setting information for the operation of the terminal 120. The storage unit 320 may include a volatile memory, a non-volatile memory, and/or a combination of a volatile memory and a non-volatile memory. The storage unit 320 may provide the stored data at a request of the control unit 330.

The control unit 330 may control general operations of the terminal 120. For example, the control unit 330 may transmit and/or receive a signal through the communication unit 310. Alternatively or additionally, the control unit 330 may record and/or read data in and/or from the storage unit 320. The control unit 330 may perform functions of a protocol stack required by the communication standard. The control unit 330 may include at least one processor and/or a microprocessor, and/or may be a part of a processor. In an embodiment, at least a portion of the communication unit 310 and the control unit 330 may be referred to as a communication processor (CP). According to various embodiments, the control unit 330 may be included in a band sharing system, to transmit a control command to each of the devices constituting the band sharing system. Herein, the control command may include an instruction set and/or code stored in the storage unit 320, and may be an instruction/code at least temporarily residing in the control unit 330 and/or a storage space storing instructions/codes (e.g., storage unit 320), or may be a part of circuitry constituting the control unit 330.

According to various embodiments, the control unit 330 may perform grouping, by selecting at least one or more base stations 110 in the band sharing system, according to a preset condition. In optional or additional embodiments, the control unit 330 may identify groups using the same band at the same time among at least one or more groups formed through the grouping, and determine them as a cluster. For example, the control unit 330 may control the terminal 120 to perform operations according to various embodiments described in reference to FIGS. 4 to 9.

Figure 4:
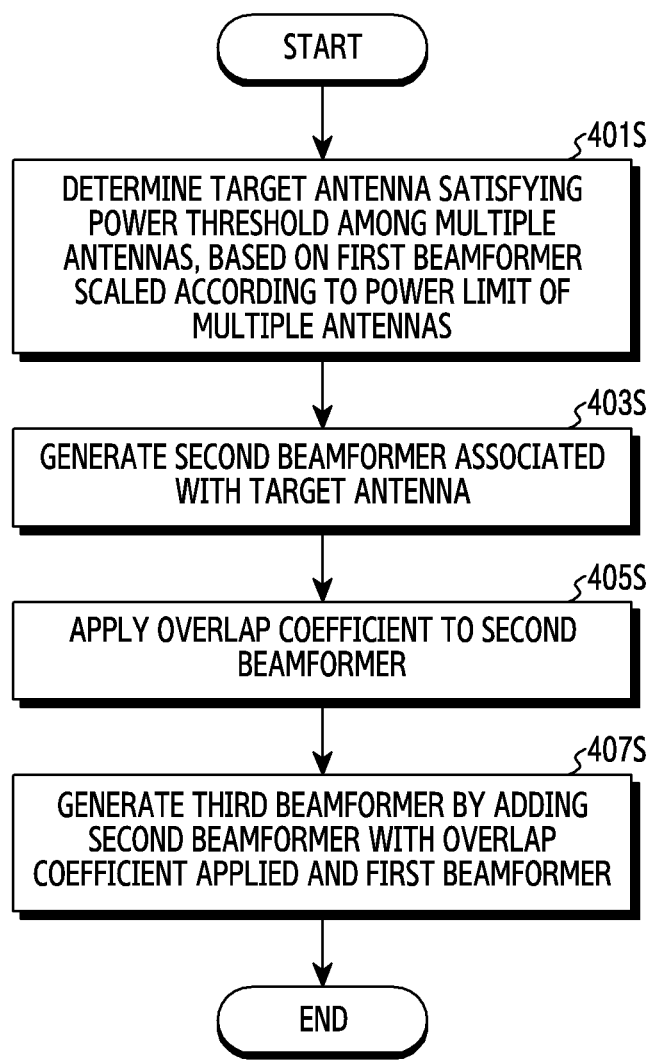
FIG. 4 is a flowchart illustrating beamformer control operations of a base station in a wireless communication system, according to various embodiments of the present disclosure.

FIG. 4 is a flowchart illustrating beamformer control operations of a base station 110 in a wireless communication system, according to various embodiments of the present disclosure.

Referring to FIG. 4, a base station 110 may generate a beamformer to transmit a signal and/or data via multiple antennas, and control the generated beamformer to efficiently operate within a range which satisfies a power limit.

If the multiple antennas operably connected to the base station 110 and/or the multiple antennas included in the base station 110 transmit and/or receive signals and/or data to and/or from a user terminal 120, there may be the power limit in relation to the power used by the multiple antennas.

The power limit may include a total loss power limit which may limit a sum of power used by all the transmit antennas and a transmit power limit per antenna which may limit a maximum available power of each antenna of the multiple antennas in the antenna array.

The generated beamformer may be reduced in scale in order to satisfy the power limit. The scale reduction operation may be referred to as scaling. Scaling may be performed to scale down the transmit power in order to satisfy every power limit per antenna of the multiple antennas in the antenna array.

To perform the scaling such that every antenna of the multi-antenna satisfies the power limit, a scaling value may be transmitted for the antenna exceeding the power limit at the highest rate that satisfies the power limit. Accordingly, to satisfy the beamforming characteristic, if scaling is performed according to this scaling value, antennas which already satisfy the power limit, and/or exceed the power limit at a relatively low rate, may use excessively low power.

That is, scaling may be understood as reducing an amplitude of a signal transmitted and/or received by the antenna. As such, the amplitude applied to all the antennas may be equally scaled down based on a maximum value of amplitudes of a first beamformer. However, since most of the first beamformers have the amplitude applied to each antenna scattered over a wide range, the beamformer scaled down based on the maximum amplitude may use much lower power than the total available power limit. Thus, to satisfy the power limit per antenna, an excessively low power may be used, when compared to the power limit of the entire antenna, which may degrade a communication speed of the signal being transmitted by the antenna.

In equations considered in the present disclosure, bold letters in lowercase and uppercase indicate a column vector and a matrix. $A^T$, $A^H$ and $A^+$ denote a transpose, a conjugate transpose and a pseudo-inverse of a matrix A, respectively. $(A)_{(a,:)}$ denotes an a-th column of the matrix A, $(A)_{(:,b)}$ denotes a b-th row of matrix A, and $(a)_{(i)}$ denotes an i-th element of a vector a. An absolute value of a complex number is denoted by $|\cdot|$, $\ell_2$ norm of the vector is denoted by $\|\cdot\|$, the Frobenius norm of the matrix is denoted by $\|\cdot\|_F$, and a size of a set is denoted by $\mathcal{C}(\cdot)$. $0_a$ denotes a a×1 all zero vector, and $I_a$ denotes a a×a identity matrix.

In operation 401S, the base station 110 may determine a target antenna satisfying a power threshold among multiple antennas based on the first beamformer scaled according to the power limit of the multiple antennas.

The base station 110 may generate the scaled first beamformer, according to the power limit of the multiple antennas. The power limit may be a distinct value predefined for each antenna for each of the multiple antennas. Alternatively or additionally, each antenna for each of the multiple antennas may have a same power limit. The first beamformer may be referred to as an initial beamformer. In an embodiment, scaling performed on the first beamformer may be performed equally on every antenna of the multi-antenna, to maintain the beamforming characteristic for each antenna.

Scaling may be performed by equally scaling down the amplitude applied to all the antennas based on the maximum value of the amplitudes of the first beamformer, such that all the antennas may satisfy the power limit per antenna through the scaling. However, it may be necessary to distinguish a specific antenna, to compensate for the communication quality degradation due to using an excessively low power.

The power threshold may be a criterion for identifying a corresponding antenna. For example, when a specific antenna, which satisfies the power limit, is configured to use an excessively lower power than the power limit value.

If the base station 110 identifies the corresponding antenna, the base station 110 may separately perform an operation for the power compensation only on this antenna.

The power threshold may be a value lower than the power limit value of the individual antenna, and may indicate a power value for maintaining the communication quality and/or the communication speed over a specific level.

That is, if the power limit value of the individual antenna is determined as $P_{PAPC}$, the power threshold may be p times $P_{PAPC}$ (e.g., $p \times P_{PAPC}$, where $0 \le p \le 1$). In an embodiment, the value p may be designated by a user. Alternatively or additionally, the value of p may vary depending on data and/or a signal to be transmitted by the base station 110. For example, if the value p is determined to be 0.9, the base station 110 may determine the power threshold to be a value corresponding to 90% of the power limit value of the individual antenna.

In this case, satisfying the power threshold may indicate that the available power value of the specific antenna selected based on the scaled beamformer is less than the power threshold. Hence, determining the target antenna satisfying the power threshold may be understood as determining every antenna which uses a value less than the power threshold among the multiple antennas.

For example, if the value p is 0.9, then each antenna may use less than 90% of the power limit value of the antenna. That is, for example, the power threshold may be 85% of the individual antenna power limit value, by the scaled first beamformer. Thus, in such an example, an antenna using 85% of the individual antenna power limit value may be the target antenna.

In an embodiment, and continuing the example, if there are 32 individual antennas in total constituting the multi-antenna array, and if the number of antennas using less than 90% of the power limit value is twenty (20), then the twenty antennas satisfying the power threshold may be determined to be the target antenna.

In operation 403S, the base station 110 may generate a second beamformer associated with the target antenna.

The second beamformer may be a beamformer newly designed for the target antenna. For example, if the number of the antennas determined as the target antenna is 20, then the second beamformer may be generated only for the 20 target antennas. The second beamformer may be generated in consideration of overlapping with the first beamformer with respect to the target antenna. In this case, a method for designing the second beamformer for the overlapping is not limited, and all well-known methods may be used.

However, the present disclosure describes a case in which a zero-forcing (ZF) beamformer is used. Considering N≤M-ary users having a single antenna, the number k of columns of the ZF beamformer may be determined to be equal to the number N of the users, where N, M, and k are positive integers greater than zero (0). If a channel between all M-ary transmit antennas and all N-ary users is H, the second beamformer $\hat{W}$ considering the ZF beamformer may be calculated as in Equation 1.

$$\hat{W} = (H)_{(i \in \mathcal{J},:)}^{\dagger} \quad \text{[Equation 1]}$$

In an embodiment, if the first beamformer F is also designed as the ZF beamformer, the beamformer after the overlapping may also has the characteristic of the ZF beamformer, and interference may be canceled as in Equation 2.

$$(H)_{(:,l)}^{H}(F + WA)_{(:,k)} = (H)_{(:,l)}^{H}(F)_{(:,k)} + (A)_{(k,k)}(H)_{(:,l)}^{H}(W)_{(:,k)} \quad \text{[Equation 2]}$$
$$= (A)_{(k,k)}(H)_{(:,l)}^{H}(W)_{(:,k)}$$
$$= (A)_{(k,k)} \sum_{i \in \mathcal{J}} (H)_{(i,l)}^{H}(W)_{(i,k)} +$$
$$(A)_{(k,k)} \sum_{i \notin \mathcal{J}} (H)_{(i,l)}^{H} 0$$
$$= 0$$

Referring to Equation 2, l≠k, and the last equation may be derived from the fact that the overlapping second beamformer W is generated from the pseudo-inverse of $(H)_{(i \in \mathcal{J},:)}$. The complete interference cancellation as described above indicates that the beamformer overlapping may only increase the desired signal size and, thus, may improve communication speed in every beamformer overlapping.

In operation 405S, the base station 110 may apply an overlap coefficient matrix to the second beamformer.

The overlap coefficient matrix may be defined as an overlap coefficient matrix A. The criterion for determining the overlap coefficient matrix may be determined independently of the design of the first beamformer and/or the second beamformer. However, in an embodiment of the present disclosure, the overlap coefficient matrix may be determined based on the first beamformer, which is the initial beamformer, and the beamformer after the overlapping. For example, the overlap coefficient matrix A may be calculated as in the following Equation 3 such that each column of the second beamformer has a similar norm value.

$$(A)_{(a,b)} = \begin{cases} \alpha \|(W)_{(:,a)}\|_2^{-1}, & a = b \\ 0, & a \neq b \end{cases} \quad \text{[Equation 3]}$$

Referring to Equation 3, a∈ℂ may be a value that maximizes the transmit power while the overlapped beamformer satisfies the power limits of the antennas. In an embodiment, a may be a preset value. Alternatively or additionally, a may be a value updated in consideration of antenna characteristics and/or the data and/or the signal to transmit.

Applying the overlap coefficient matrix may be understood as performing a matrix operation between the overlap coefficient matrix A and the second beamformer W.

In operation 407S, the base station 110 may generate a third beamformer by adding (e.g., combining) the second beamformer to which the overlap coefficient matrix has been applied and the first beamformer.

The adding (or combining) operation may be understood as a matrix operation between the modified second beamformer WA to which the overlap coefficient matrix has been applied and the first beamformer F, which is the initial beamformer.

The modified second beamformer to which the overlap coefficient matrix has been applied may increase the power usage of one or more specific antennas satisfying the power threshold in the initial beamformer, through the matrix operation with the initial beamformer. Since the power usage increase for the one or more specific antennas, may increase the power used in data and/or signal transmission while satisfying the power limit per antenna, the modified second beamformer may contribute to the communication speed improvement.

Adding (e.g., overlapping) the beamformers may be performed by generating a new beamformer $\hat{W}$ for the target antennas, and overlapping W aligned in the dimension with the existing beamformer by allocating the value 0 to antennas not corresponding to the target antennas.

If the target antennas are less than the total number of the antennas constituting the multi-antenna, the new beamformer $\hat{W}$ may not be simply added to the first beamformer, and accordingly the adding operation may be performed through W aligned in the dimension with the first beamformer, by allocating the value 0 to the antennas not corresponding to the target antennas among the antennas constituting the multi-antenna.

The criterion for determining the number of the overlappings may include various criteria such as, but not limited to, until every antenna of the overlapping beamformer uses the power above a reference value $P_{PAPC} \times p$ or until the number of the antennas using the power below the reference value falls below a specific number.

Figure 5:
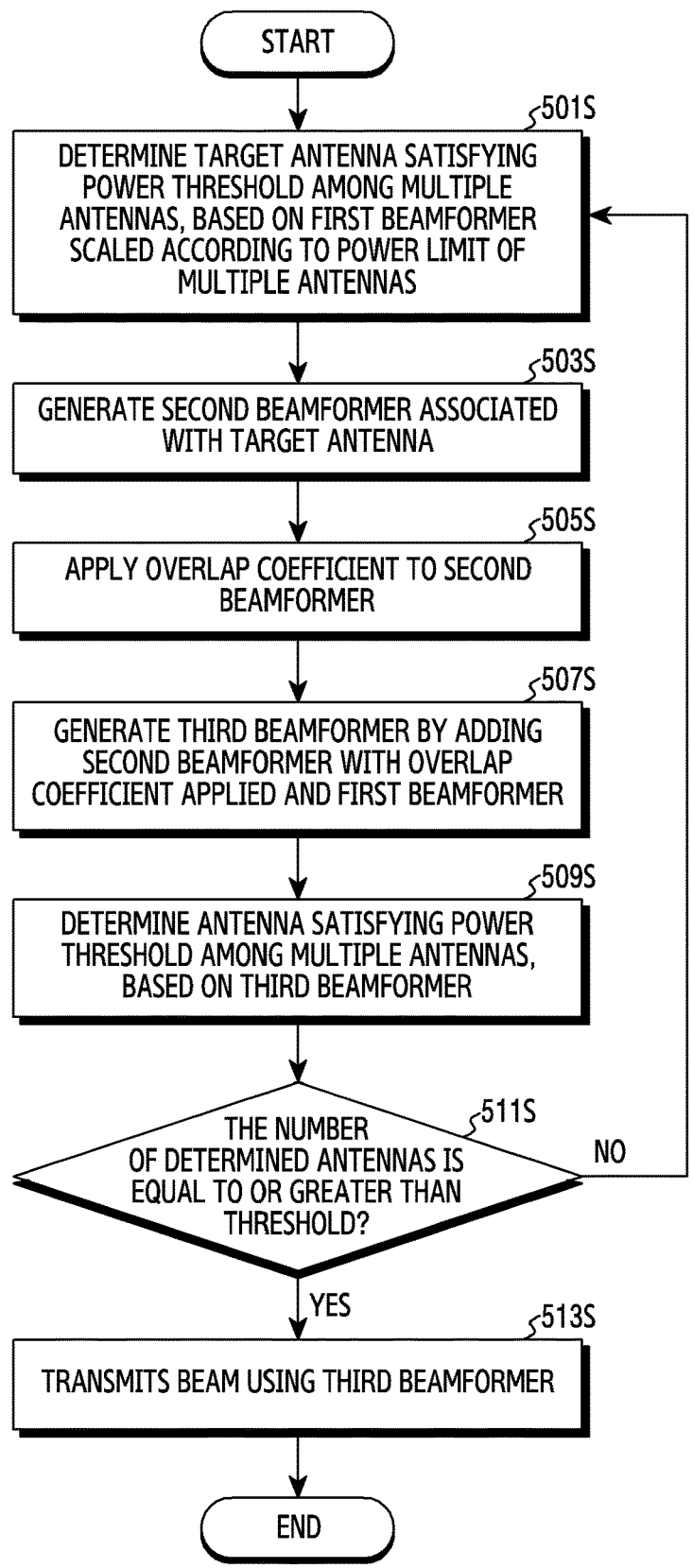
FIG. 5 is a flowchart illustrating beamformer control operations of a base station including iterative beamformer generation in a wireless communication system, according to various embodiments of the present disclosure.

FIG. 5 is a flowchart illustrating beamformer control operations of a base station 110 including iterative beamformer generation in a wireless communication system, according to various embodiments of the present disclosure.

Referring to FIG. 5, the base station 110 may determine whether to transmit a signal and/or data through the third beamformer determined by the operations included in the flowchart of FIG. 4.

In operation 501S, the base station 110 may determine a target antenna that satisfies a power threshold among multiple antennas, based on a first beamformer scaled according to the power limit of the multiple antennas.

The determining of the target antenna of operation 501S may include or may be similar in many respects to the operations described above in reference to operation 401S. The determining of the target antenna based on the first beamformer may be understood as, if the antenna forms a beam by the first beamformer, determining whether the power limit value used by the individual antenna satisfies a specific threshold, and accordingly determining the target antenna.

In operation 503S, the base station 110 may generate a second beamformer associated with the target antenna.

The generating of the second beamformer of operation 503S may include or may be similar in many respects to the operations described above in reference to operation 403S. The generating of the second beamformer associated with the target antenna may be understood as generating the second beamformer for the antenna determined as the target antenna among the multiple antennas included in the base station 110.

In operation 505S, the base station 110 may apply an overlap coefficient matrix to the second beamformer. The applying of the overlap coefficient matrix of operation 505S may include or may be similar in many respects to the operations described above in reference to operation 405S.

In operation 507S, the base station 110 may generate a third beamformer by adding the second beamformer to which the overlap coefficient matrix has been applied and the first beamformer. The generating of the third beamformer of operation 507S may include or may be similar in many respects to the operations described above in reference to operation 407S.

In operation 509S, the base station 110 may determine an antenna satisfying the power threshold among the multiple antennas, based on the third beamformer.

The third beamformer may indicate a beamformer generated as a result of power compensation for the target antenna through the overlapping. The base station 110 may determine the antenna which satisfies the power threshold by the third beamformer among the multiple antennas. The power threshold may be understood as the same concept as the power threshold described above with reference to operation 501S.

For example, if the power threshold corresponds to 0.9 of the maximum power limit value of a specific individual antenna, it may be identified whether the specific individual antenna transmitting a signal through the third beamformer satisfies 90% or more of the maximum power limit value. Herein, satisfying the power threshold may be understood as determining whether the value corresponding to the power threshold or more is identified. That is, operation 509S may identify whether the power used by the specific individual antenna exceeds 90% of the maximum power limit, for example, if the beamforming is conducted based on the third beamformer. The examples described above only use 0.9 of the maximum power limit. However, the present disclosure is not limited in this regard. That is, it may be understood that all cases in which a value is within $0 \leq p \leq 1$ times of the maximum power limit $P_{PAPC}$ is selectable are included.

In operation 511S, the base station 110 may determine whether the determined number of the antennas is equal to or greater than a threshold.

The determined antenna may indicate an antenna for using power exceeding the power threshold, if the beamforming is performed through the third beamformer generated by the overlapping. For example, operation 511S may be a process for, assuming that p is 0.9, determining whether the number of the corresponding antennas identified to use the power below 90% (e.g., 85%) is greater than or equal to the threshold, if the first beamformer is generated by the scaling based on the power limit and a signal is transmitted via a specific antenna by the first beamformer. Alternatively or additionally, determining whether the number of the corresponding antennas identified to use the power over 90% if a signal is transmitted via a specific antenna by the third beamformer. The threshold may indicate the number of the antennas, and more specifically, may indicate the number of antennas exceeding the power threshold by the third beamformer among the target antennas. Hence, the threshold may be smaller than or equal to the number of the target antennas.

For example, assuming that 20 target antennas have been determined, if a signal is transmitted by the third beamformer generated by the overlapping, if two antennas exceeding the power threshold are detected among the 20 target antennas, the number of the antennas determined in operation 511S may be 2.

In order to potentially improve the data rate of the target antenna, the base station 110 may determine whether to terminate the operation based on whether all or most of the target antennas exceed the power threshold. For example, if 15 out of the 20 target antennas are preset as the threshold, the base station 110 may determine whether the number of the antennas satisfying the power threshold by the third beamformer is 15 or more in operation 511S.

In operation 513S, the base station 110 may transmit a beam using the third beamformer, in response to determining that the determined number of the antennas is equal to or greater than the threshold (YES in operation 511S).

If determining that the number of the antennas satisfying the power threshold among the target antennas is greater than or equal to the threshold, the base station 110 may transmit a beam through the generated third beamformer because sufficient data rate improvement may be expected.

However, if determining that the determined number of the antennas is less than the threshold, the base station 110, which may not expect the target data rate improvement with the currently generated third beamformer, may return to operation 501S to redetermine the target antennas.

Figure 6:
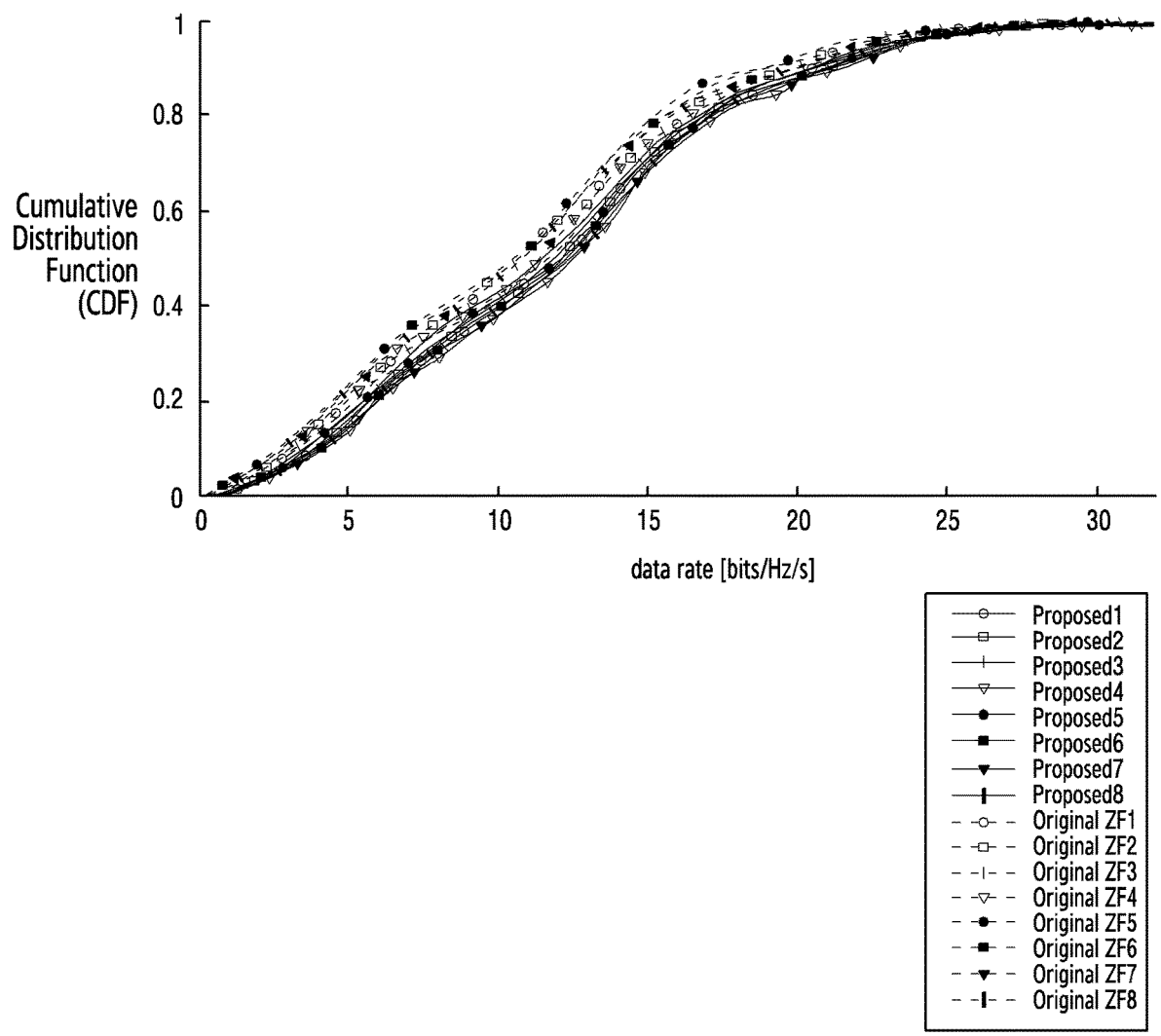
FIG. 6 illustrates communication speed changes according to an operation of a base station, according to various embodiments of the present disclosure.

FIG. 6 is a diagram illustrating communication speed changes according to an operation of a base station 110, according to various embodiments of the present disclosure.

Referring to FIG. 6, the effect of the operation of the base station 110, according to an embodiment of the present disclosure, may be identified in a communication system between eight (8) users (N=8) having a single antenna and a base station 110 having 64 antennas (M=64).

The eight (8) users for the communication speed measurement using the beamformer overlapping of the present disclosure may be referred to as Proposed 1 to 8, and the eight (8) users for the communication speed measurement using a related base station may be referred to as Original ZF1 to ZF8.

In FIG. 6, it may be identified that result values of the Proposed 1 to 8 represented by solid lines are biased to the right compared to the Original ZF1 to ZF8 represented by dotted lines. In the graph of FIG. 6, the x-axis indicates the data rate, and the communication speed increase of each user may be identified, if the beamformer overlapping according to the present disclosure is used.

Figure 7:
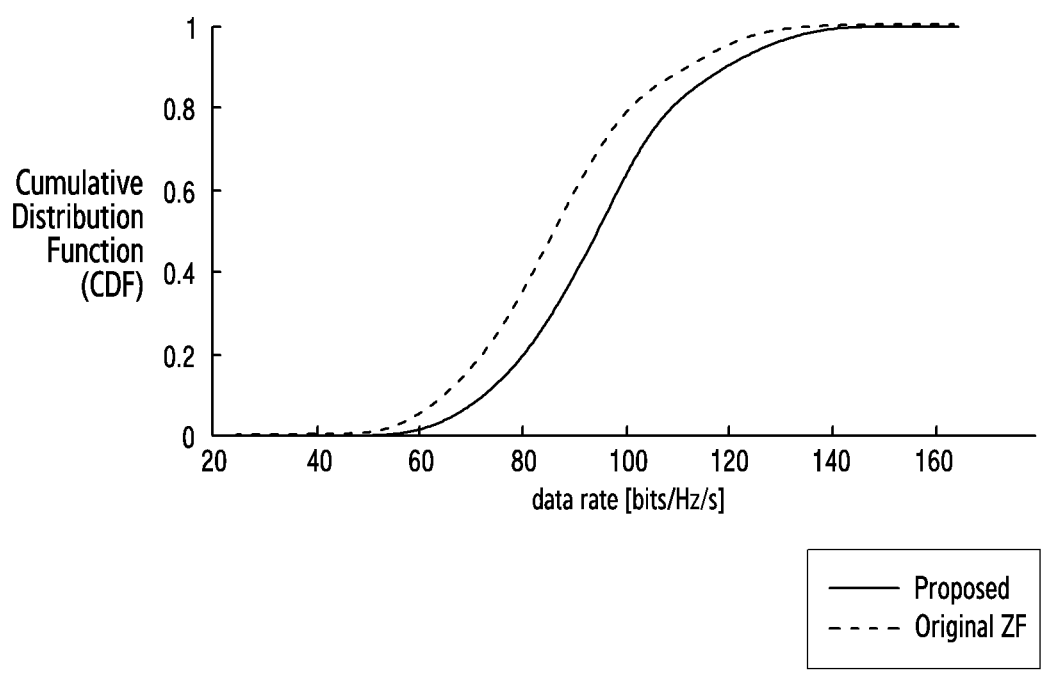
FIG. 7 illustrates a total communication speed change according to an operation of a base station, according to various embodiments of the present disclosure.

FIG. 7 illustrates total communication speed changes according to an operation of a base station 110, according to embodiments of the present disclosure.

Referring to FIG. 7, the communication speed changes of the base station 110 for all terminal users may be identified if the beamformer overlapping is used according to the present disclosure (Proposed) in comparison to a related communication system (Original ZF).

In FIG. 7, it may be identified that result values of the proposed indicated by the solid line is biased to the right compared to result values of the original ZF indicated by the dotted line. In the graph of FIG. 7, the x-axis indicates the data rate, and the communication speed increase of every user may be identified, if the beamformer overlapping according to the present disclosure is used.

According to an embodiment, the beamformer overlapping operation of the base station 110 may be performed by an overlapping coefficient matrix narrowly designed for a specific antenna. That is, the narrow power distribution for the specific user in a multi-user environment having a single antenna may be considered. The narrow power distribution may be considered to maximize the total communication speed if there is a considerable difference in a channel gain between the transmitter and each receiving antenna, or to ensure more stable service quality by compensating for a low channel gain. There is no limitation on the beamformer for this purpose, but the ZF beamformer may be considered as an example.

The narrow power distribution for a specific receive antenna may be implemented based on the overlap coefficient matrix A as shown in Equation 4.

$$(A)_{(a,b)} = \begin{cases} \alpha_a \| (W)_{(:,a)} \|_2^{-1}, & a = b \\ 0, & a \neq b \end{cases} \quad \text{[Equation 4]}$$

Referring to Equation 4, $\alpha_a \in \mathbb{C}$, $a \in \{1, \ldots, N\}$ may be determined to use more power in a specific column of the overlapped beamformer F+WA within a range where the overlapped beamformers satisfy every power limit, which may allow the specific receive antenna to receive more power.

Figure 8:
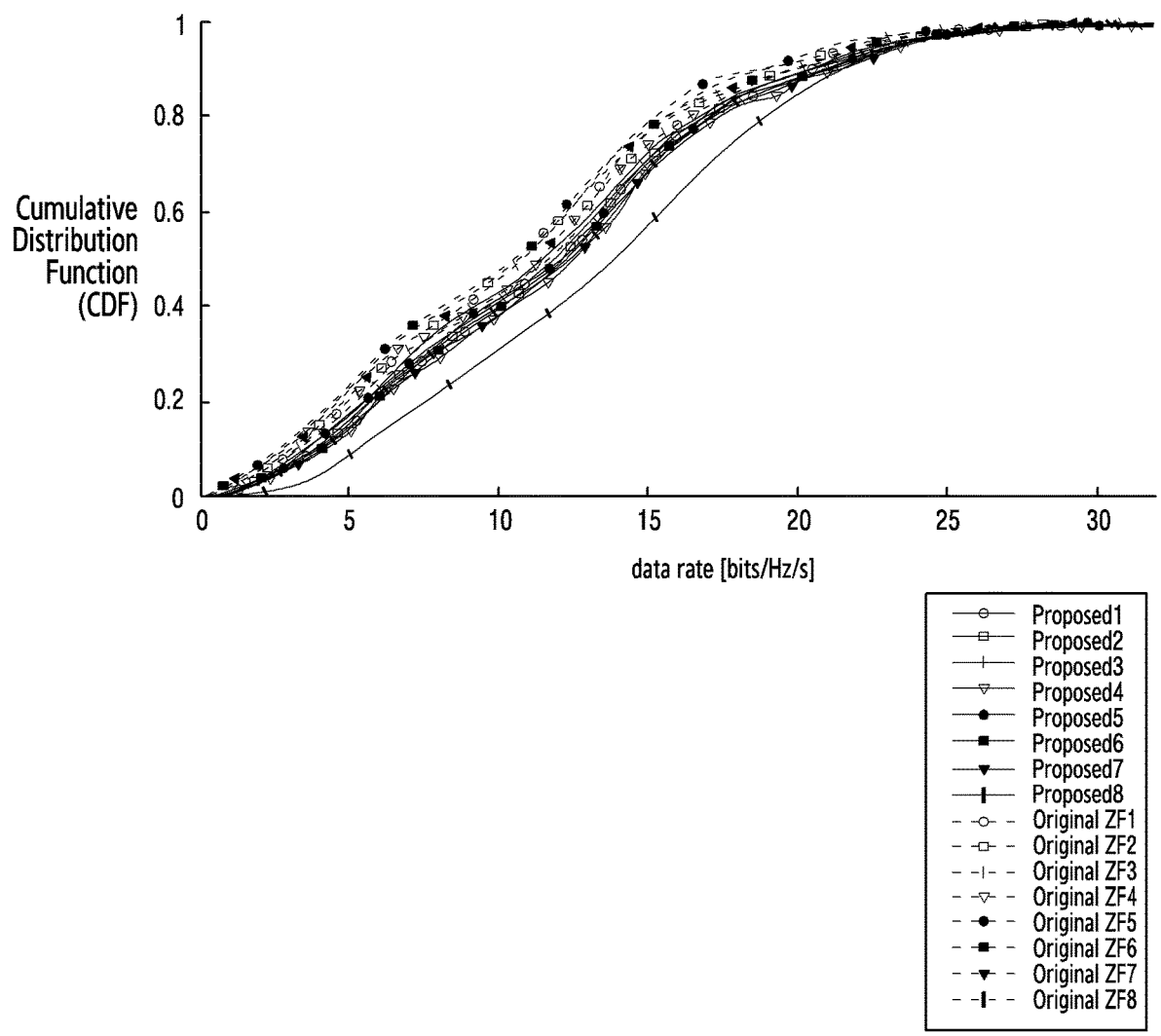
FIG. 8 illustrates communication speed changes if an operation of a base station is performed under narrow power distribution, according to various embodiments of the present disclosure.

FIG. 8 illustrates communication speed changes if a base station 110 operation is performed under narrow power distribution, according to various embodiments of the present disclosure.

Referring to FIG. 8, a gain of a specific user according to the present disclosure may be identified, if elements of the overlap coefficient matrix are given as shown in Equation 5 in a communication system between eight (8) users (N=8) having a single antenna and a base station 110 having 64 antennas (M=64).

$$|\alpha_1| = |\alpha_2| = \cdots = |\alpha_7| = \frac{|\alpha_8|}{4} \quad \text{[Equation 5]}$$

If the beamformer overlapping according to the present disclosure is used, users for the communication speed measurement may be referred to as Proposed 1 to 8, and users of a related communication system may be referred to as Original ZF1 to ZF8.

In FIG. 8, it may be identified that result values of the Proposed 1 to 8 represented by solid lines are biased to the right compared to the Original ZF1 to ZF8 represented by dotted lines. In addition, Proposed 8 may be identified to be biased further to the right, compared to the other user terminals (e.g., Proposed 1 to 7). The x-axis indicates the data rate in the graph of FIG. 8, and accordingly if the beamformer overlapping of the present disclosure is used, the communication speed increase of each user, and the fastest communication speed of the Proposed 8 having a gain approximately four (4) times the other users according to Equation 5 may be identified.

Figure 9:
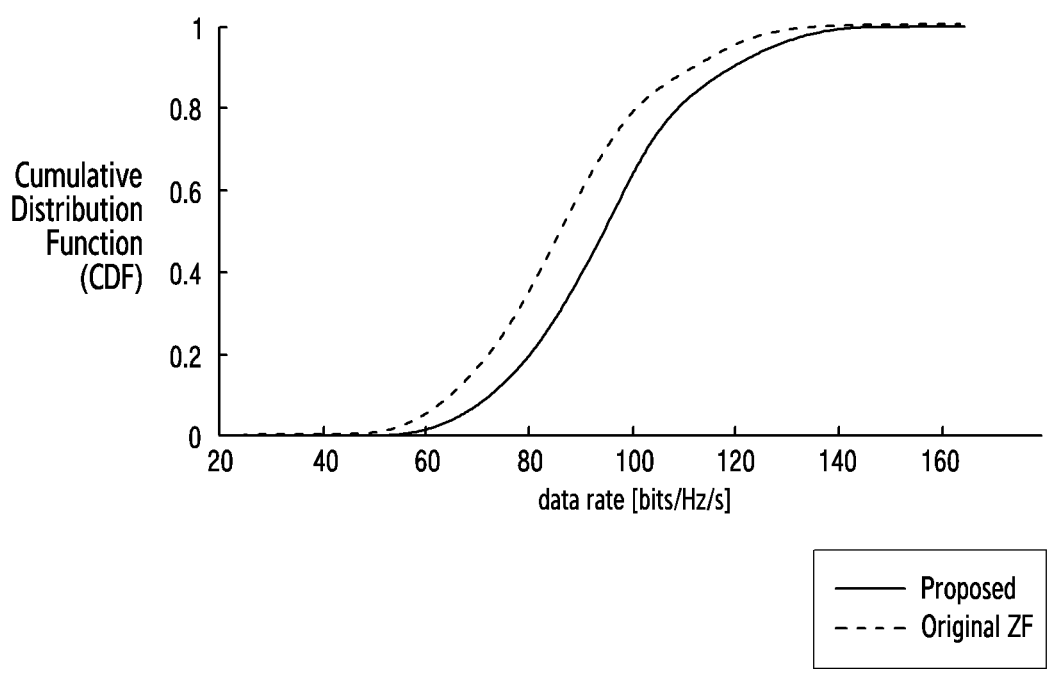
FIG. 9 illustrates a total communication speed change if an operation of a base station is performed under narrow power distribution, according to an embodiment of the present disclosure.

FIG. 9 illustrates a total communication speed change if a base station 110 operation is performed under narrow power distribution, according to various embodiments of the present disclosure.

Referring to FIG. 9, the communication speed changes of the base station 110 for all terminal users may be identified if the beamformer overlapping is used according to the present disclosure (Proposed) and in a related communication system (Original ZF).

In FIG. 9, it may be identified that result values of Proposed represented by a solid line are biased to the right compared to result values of Original ZF represented by a dotted line. The x-axis indicates the data rate, and the communication speed increase of every user may be identified, if the beamformer overlapping according to the present disclosure is used.

According to embodiments of the present disclosure, an operating method of a base station in a wireless communication system using multiple antennas includes determining an antenna satisfying a power threshold among the multiple antennas, based on a first beamformer scaled according to power limit, generating a second beamformer associated with the antenna, applying an overlap coefficient matrix to the second beamformer, and generating a third beamformer by adding the second beamformer to which the overlap coefficient matrix is applied and the first beamformer.

The method further includes determining an antenna satisfying a power threshold among the multiple antennas, based on the third beamformer, and determining whether the number of the determined antennas is greater than or equal to a threshold.

The method further includes transmitting a signal using the third beamformer, in response to determining that the number of the determined antennas is greater than or equal to the threshold.

The method further includes, in response to determining the number of the determined antennas to be less than the threshold, redetermining an antenna satisfying the power threshold among the multiple antennas, based on the first beamformer scaled according to the power limit.

The first beamformer may scale down at least one or more amplitudes applied to the multiple antennas at the same rate based on a maximum value among amplitudes associated with the first beamformer.

The overlap coefficient matrix may be determined based on the first beamformer and the third beamformer.

The overlap coefficient matrix may be determined in a range where transmission power using the third beamformer is less than a value corresponding to all power limits of the multiple antennas.

The overlap coefficient matrix may be determined in a range where transmission power using the third beamformer is less than a value corresponding to power limit of at least one antenna of the multiple antennas.

According to other embodiments of the present disclosure, an apparatus of a base station in a wireless communication system using multiple antennas may include a communication unit; and at least one control unit operatively connected to the communication unit, and the at least one control unit may be configured to determine an antenna satisfying a power threshold among the multiple antennas, based on a first beamformer scaled according to power limit, generate a second beamformer associated with the antenna, apply an overlap coefficient matrix to the second beamformer, and generate a third beamformer by adding the second beamformer to which the overlap coefficient matrix is applied and the first beamformer.

The at least one control unit may be configured further to determine an antenna satisfying a power threshold among the multiple antennas, based on the third beamformer, and determine whether the number of the determined antennas is greater than or equal to a threshold.

The at least one control unit may be configured further to transmit a signal using the third beamformer, in response to determining that the number of the determined antennas is greater than or equal to the threshold.

The at least one control unit may be configured further to, in response to determining the number of the determined antennas to be less than the threshold, redetermine an antenna satisfying the power threshold among the multiple antennas, based on the first beamformer scaled according to the power limit.

The first beamformer may scale down at least one or more amplitudes applied to the multiple antennas at the same rate based on a maximum value among amplitudes associated with the first beamformer.

The overlap coefficient matrix may be determined based on the first beamformer and the third beamformer.

The overlap coefficient matrix may be determined in a range where transmission power using the third beamformer is less than a value corresponding to all power limits of the multiple antennas.

The overlap coefficient matrix may be determined in a range where transmission power using the third beamformer is less than a value corresponding to power limit of at least one antenna of the multiple antennas.

It should be appreciated that various embodiments of the present disclosure and the terms used therein are not intended to limit technological features disclosed in this document to particular embodiments, and include various changes, equivalents, or replacements for a corresponding embodiment.

With regard to the descriptions of the drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include one, or all possible combinations of the items enumerated together in a corresponding one of the phrases. Such terms as "1st" and "2nd," or "first" and "second" may be used to simply distinguish a corresponding component from another, and does not limit the components in other aspect (e.g., importance or order). If an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

The term "module" used in various embodiments of the present disclosure may include a unit implemented in hardware, software or firmware, and may be interchangeably used with other term, for example, logic, a logic block, a part, or circuitry. The module may be a single integral component, or a minimum unit or part thereof, for performing one or more functions. For example, according to an embodiment, the module may be implemented in a form of an application-specific integrated circuit (ASIC).

Various embodiments of the present disclosure may be implemented as software including one or more instructions which are stored in a storage medium (e.g., storage unit 230 or storage unit 320) readable by a machine (e.g., base station 110, terminal 120). For example, a processor (e.g., control unit 240, control unit 330) of the machine (e.g., base station 110, terminal 120) may invoke at least one of the one or more instructions stored in the storage medium, and execute it or them. This allows the machine to be operated to perform at least one function according to the at least one instruction invoked. The one or more instructions may include a code generated by a compiler and/or a code executable by an interpreter. The machine-readable storage medium may be provided in the form of a non-transitory storage medium. Herein, non-transitory may refer to a storage medium that is a tangible device, and does not include a signal (e.g., an electromagnetic wave), but this term does not differentiate between a case where data is semi-permanently stored in the storage medium and a case where the data is temporarily stored.

According to an embodiment, a method according to various embodiments of the present disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) directly or online via an application store (e.g., Play Store™), or between two user devices (e.g., smart phones). If distributed online, at least part of the computer program product may be temporarily stored in the machine-readable storage medium such as a memory of a manufacturer's server, a server of the application store, or a relay server, or may be temporarily generated.

According to various embodiments, each component (e.g., a module or a program) of the above-described components may include a single entity or multiple entities, and some of the multiple entities may be separately deployed in different components. According to various embodiments, one or more component or operations of the above-described components may be omitted, or one or more other components or operations may be added. Alternatively or additionally, a plurality of components (e.g., modules or programs) may be integrated as a single component. In this case, the integrated component may perform one or more functions of each component of the plurality of components in the same or similar manner as they are performed by a corresponding component of the plurality of components before the integration. According to various embodiments, operations performed by the module, the program, or other component may be carried out sequentially, in parallel, repeatedly, or heuristically, or one or more of the operations may be executed in a different order or omitted, or one or more other operations may be added.

What is claimed is:

1. A method performed by a base station in a wireless communication system, the method comprising:
   determining, from among a plurality of antennas of the base station, a first antenna that meets a power threshold, based on a first beamformer scaled according to a power limit;
   generating a second beamformer corresponding to the first antenna;
   applying an overlap coefficient matrix to the second beamformer;
   generating a third beamformer by combining the second beamformer to which the overlap coefficient matrix has been applied and the first beamformer; and
   transmitting a signal using the third beamformer.

2. The method of claim 1, further comprising:
   determining, from among the plurality of antennas, a second antenna that meets the power threshold, based on the third beamformer; and
   determining whether a number of determined antennas is greater than or equal to a threshold.

3. The method of claim 2, wherein the transmitting of the signal comprises:
   transmitting the signal using the third beamformer, based on determining that the number of determined antennas is greater than or equal to the threshold.

4. The method of claim 2, further comprising:
   based on determining that the number of determined antennas is less than the threshold, determining, from among the plurality of antennas, a fourth antenna that meets the power threshold, based on the first beamformer scaled according to the power limit.

5. The method of claim 1, further comprising:
   scaling down, according to the first beamformer, one or more amplitudes applied to the plurality of antennas at a same rate, based on a maximum value of amplitudes corresponding to the first beamformer.

6. The method of claim 1, further comprising:
   determining the overlap coefficient matrix based on the first beamformer and the third beamformer.

7. The method of claim 1, further comprising:
   determining the overlap coefficient matrix such that a transmission power of the third beamformer is less than a power limit value corresponding to respective power limits of the plurality of antennas.

8. The method of claim 1, further comprising:
   determining the overlap coefficient matrix such that a transmission power of the third beamformer is less than a corresponding power limit value of at least one antenna of the plurality of antennas.

9. An apparatus of a base station in a wireless communication system, the apparatus comprising:
   a transceiver comprising a plurality of antennas; and
   at least one processor coupled to the transceiver,
   wherein the at least one processor is configured to:
      determine, from among the plurality of antennas, a first antenna that meets a power threshold, based on a first beamformer scaled according to a power limit;
      generate a second beamformer corresponding to the first antenna;
      apply an overlap coefficient matrix to the second beamformer;
      generate a third beamformer by combining the second beamformer to which the overlap coefficient matrix has been applied and the first beamformer; and
      transmit a signal using the third beamformer.

10. The apparatus of claim 9, wherein the at least one processor is further configured to:
    determine, from among the plurality of antennas, a second antenna that meets the power threshold, based on the third beamformer, and
    determine whether a number of determined antennas is greater than or equal to an threshold.

11. The apparatus of claim 10, wherein the at least one processor is further configured to:
    transmit the signal using the third beamformer, based on determining that the number of determined antennas is greater than or equal to the threshold.

12. The apparatus of claim 10, wherein the at least one processor is further configured to:
    based on determining that the number of determined antennas is less than the threshold, determine, from among the plurality of antennas, a fourth antenna that meets the power threshold, based on the first beamformer scaled according to the power limit.

13. The apparatus of claim 9, wherein the at least one processor is further configured to:
    scale down, according to the first beamformer, one or more amplitudes applied to the plurality of antennas at a same rate, based on a maximum value of amplitudes corresponding to the first beamformer.

14. The apparatus of claim 9, wherein the at least one processor is further configured to:
    determine the overlap coefficient matrix based on the first beamformer and the third beamformer.

15. The apparatus of claim 9, wherein the at least one processor is further configured to:
    determine the overlap coefficient matrix such that a transmission power of the third beamformer is less than a power limit value corresponding to respective power limits of the plurality of antennas.

16. The apparatus of claim 9, wherein the at least one processor is further configured to:
    determine the overlap coefficient matrix such that a transmission power of the third beamformer is less than a corresponding power limit value of at least one antenna of the plurality of antennas.

* * * * *